United States Patent
Mitter

(10) Patent No.: US 7,395,673 B2
(45) Date of Patent: Jul. 8, 2008

(54) DEVICE FOR CREATING A REFERENCE HUMIDITY

(75) Inventor: Helmut Mitter, Hellmonsödt (AT)

(73) Assignee: E + E Elektronik Ges. m.b.H., Engervitzdorf (AT)

( * ) Notice: Subject to any disclaimer, the term of this patent is extended or adjusted under 35 U.S.C. 154(b) by 525 days.

(21) Appl. No.: 11/196,029

(22) Filed: Aug. 3, 2005

(65) Prior Publication Data

US 2006/0026977 A1    Feb. 9, 2006

(30) Foreign Application Priority Data

Aug. 4, 2004   (DE) ...................... 10 2004 038 020

(51) Int. Cl.
  *F25D 17/04* (2006.01)
  *B01F 3/04* (2006.01)
  *B01D 19/00* (2006.01)
  *F02M 23/14* (2006.01)

(52) U.S. Cl. ...................... 62/176.1; 261/128; 261/135; 261/156

(58) Field of Classification Search ................ 62/176.1; 236/44 R, 44 A, 44 C; 261/128, 135, 142, 261/130, 129, 152, 156
See application file for complete search history.

(56) References Cited

U.S. PATENT DOCUMENTS 3,854,909 A * 12/1974 Hoisington et al. ........... 96/327
4,618,462 A    10/1986 Fisher
6,299,147 B1   10/2001 Mitter 6,863,268 B2 * 3/2005 Zhang ........................ 261/130
2002/0121103 A1   9/2002 Udobot et al.

FOREIGN PATENT DOCUMENTS

EP         0 989 373 A2    3/1999

OTHER PUBLICATIONS

Greenspan, L., "Functional Equations for the Enhancement Factors for $CO_2$—Free Moist Air," Journal of Research of the National Bureau of Standards—A. Physics and Chemistry, vol. 80A, No. 1, Jan.-Feb. 1976, pp. 41-44. USA.
Hasegawa, S. et al., "The NBS Two-Pressure Humidity Generator, Mark 2," Journal of Research of the National Bureau of Standards—A. Physics and Chemisty, vol. 81A, No. 1, Jan.-Feb. 1977, pp. 81-88. USA.
Scholz, G., "A Standard Calibrator for Air Hygrometers," Bulletin OIML, No. 97, Dec. 1984, pp. 18-27. USA.
Sonntag, D., "Important New Values of the Physical Constant of 1986, Vapour Pressure Formulations Based on the ITS-90, and Psychrometer Formulae," Z. Meteorol., vol. 70, No. 5, 1990, pp. 340-344. USA.
Hardy, B., "ITS-90 Formulations for Vapor Pressure, Frostpoint Temperature, Dewpoint Temperature, and Enhancement Factors in the Range –100 to +100C," Third International Symposium on Humidity and Moisture, 1998, pp. 214-221. USA.

* cited by examiner

*Primary Examiner*—Chen-Wen Jiang
(74) *Attorney, Agent, or Firm*—Brinks Hofer Gilson & Lione

(57) ABSTRACT

A device for creating a reference humidity that includes a saturation chamber and a condensate cooler in fluid communication with the saturation chamber and arranged downstream of the saturation chamber, wherein the condensate cooler is a fin-type condenser whose arrangement is such that substantially horizontal gas flow through the condensation cooler results. A measuring chamber connected with the condensate cooler, in which a desired reference humidity is definitely set by varying pressures and/or temperatures.

14 Claims, 4 Drawing Sheets

10

20

DEVICE FOR CREATING A REFERENCE HUMIDITY

Applicant claims, under 35 U.S.C. §119, the benefit of priority of the filing date of Aug. 4, 2004 of a German patent application, copy attached, Ser. No. 10 2004 038 020.1, filed on the aforementioned date, the entire contents of which is incorporated herein by reference.

BACKGROUND OF THE INVENTION

1. Field of the Invention

The present invention relates to a device for creating a reference humidity that includes a saturation chamber, a downstream arranged condensate cooler and a measuring chamber connected with the condensate cooler, in which a desired reference humidity can be definitely set by varying pressures and/or temperatures.

2. Discussion of Related Art

Two basically different methods for calibrating humidity measuring apparatus (for example dewpoint hygrometers for measuring the dewpoint temperature or hygrometers for measuring the relative humidity) are known at the present time and are discussed below.

Comparison Method

Here, a device for creating reference humidity, or a system in general, is utilized, by which gas or air of a predetermined, as stable as possible relative humidity or dewpoint temperature is created ("humidity representation"). A reference measuring device is required in addition, which measures the actual humidity, and whose reading is compared with the test specimen.

Relatively simple systems for representing the humidity are generally considered for the comparison method, which only need to assure sufficient stability.

Reference Method

A system, or a device, which generates gas or air of a defined temperature or a defined reference humidity, is also needed with this system. However, in contrast to the comparison method, no additional reference measuring device is required, instead the system provides the humidity or the dewpoint temperature of a known value with such high accuracy (or low uncertainty) and stability that no reference measuring device is necessary. With a correct layout of the system, the stability and accuracy of the humidity representation is clearly better than that of the known reference measuring devices.

In connection with the reference method, so-called 2-pressure/2-temperature humidity generators are customarily employed as the devices for creating reference humidity, such as they are known from EP 0 989 373 A2 or from the publication entitled "The NBS Two Pressure Humidity Generator, Mark 2", by S. Hasegawa and J. W. Little, J. Res. Nat. Bur. Stand. 81A, No. 1, pp. 81 to 88 (1977). Their functional principle will be briefly explained in what follows.

Dry air or nitrogen at a pressure $p_1$ is conducted here via a pressure regulator through a water bath in a saturation chamber (pre-saturating device) with the temperature $t_s$. As a result, practically water vapor-saturated air at an approximate dewpoint temperature $\_t_s$ at a pressure $p_1$ is obtained.

Subsequently, the saturated air is conducted through a heated connecting line with a temperature $t_{v1}>t_s$ into a condensate cooler. The condensate cooler is temperature-stabilized in a highly stable liquid bath and cools the inflowing air to the condenser temperature $t_1$, wherein the entire amount of excess water appears as the condensate. As a result, air at a pressure $p_1$ and a temperature $t_1$ is obtained, which is completely saturated with water vapor. The pressure $p_1$ and temperature $t_1$ are measured directly in the condensate cooler.

The partial water vapor pressure $e_w'(t_1, p_1)$ of the air in the condensate cooler is obtained by means of the following equation (1)

$$e_w'(t_1, p_1) = e_w(t_1) * f(p_1, t_1) \qquad \text{Equ. (1)}$$

wherein $e_w(t)$: saturation vapor pressure of water at the temperature t in the pure phase in accordance with the following reference: Sonntag, D., "Important New Values of the Physical Constants of the 1986 Vapour Pressure Formulations based on ITS-90 and Psychometer Formulae", Z. Meteorol 70 (1990) 5, pp. 340 to 344 ("the Sonntag reference").

f(p,t): actual gas correction ("enhancement factor") of air in accordance with the following references: 1) B. Hardy, "ITS-Formulations for Vapour Pressure, Frostpoint Temperature, Dewpoint Temperature and Enhancement Factors in the Range −100 to 100° C.", Third International Symposium on Humidity and Moisture (1998), pp. 214 to 221 ("the Hardy reference") and 2) Greenspan, L., "Functional Equations for Enhancement Factors for $CO_2$-Free Moist Air", J. Research NBS, A. Physics and Chemistry 80A (1976), pp. 41 to 44 ("the Greenspan reference").

$e_w'(p,t)$: saturated vapor pressure of the actual system in the presence of air or $N_2$.

The saturated air is removed from the condensate cooler through a heated connecting line with a temperature $t_{v2}>t_1$, is relaxed to the pressure $p_2$ via a heated needle valve with the temperature $t_p>t_{v2}$ and is conducted through a heated connecting line with the temperature $t_{v3}>t_{v2}$ to a consumer or measuring chamber, wherein the gas pressure $p_2$ is measured in the measuring chamber.

The partial water vapor pressure e at the location of the consumer then results as $$e = (p_2/p_1) * e_w'(p_1, t_1) \qquad \text{Equ. (2)}$$

and the dewpoint temperature $t_d$ from the equation (3):

$$e = e_w'(p_2, t_d) \qquad \text{Equ. (3)}$$

The system is operated at a continuous gas flow wherein, with the right construction, the dewpoint $t_d$ of the gas flow results merely from the measurement of the two pressures $p_1$ and $p_2$ and the condensate cooler temperature $t_1$.

By varying the condensate cooler pressure $p_1$ and the condensate cooler temperature $t_1$ it is possible to obtain minimal dewpoint temperatures of −27° C. at a maximum pressure of 9400 mbar and a temperature $t_1=0.2°$ C.

Vice versa, it is possible to obtain a maximum dewpoint temperature of 90° C. at a temperature $t_1=100°$ C. and a pressure $p_1=1430$ mbar.

By subsequently introducing the gas flow into a measuring chamber with the temperature $t_2$ it is possible to obtain a relative humidity $U_w$ $$U_w = (e/e_w'(p_2, t_2)) * 100 \qquad \text{Equ. (4)}$$

in it.

In this way it is possible to achieve minimal dewpoint temperatures up to approximately −27° C. for positive temperatures $t_1$. For lower dewpoint temperatures it would be necessary to considerably increase the condensate cooler pressure $p_1$ ($p_1=100$ bar for $t_d=−50°$ C., $p_1=400$ bar for $t_d=−60°$ C.), however, this results in technical problems regarding sturdiness and safety. But it is decisive that, based on the available experimental measurement data known in the literature, the applicability range of the functions of the Sonntag, Hardy and Greenspan references mentioned previously is limited to pressure ranges below $p_1=20$ bar.

Therefore the humidity representation for low dewpoint temperatures is no longer performed by the saturation vapor pressure with respect to water, but to ice, which leads to similar functions. The humidity representation with respect to ice is customarily obtained by two known methods.

In a first variation, dry gas is saturated over an ice layer, wherein the ice layer can be embodied as a covering of ice on helical tubes, for example, which are stabilized to a temperature of $t_1<0°$ C. In connection with this, a difficulty typically arises of producing an appropriate ice layer in the helical tubes. Moreover, the life of such a system with the amounts of ice at the tube walls, problems can arise in general because of flow losses in the helical tubes in the form of pressure losses, which in turn can lead to significant measuring errors. At the end of the life of the ice layer it is necessary to thaw the system, and a fresh covering of the tube walls with ice must be provided.

In a second variation, excess moisture is removed from moist air by sublimation in a condenser. Essentially the same process is performed as in a condensate cooler wherein, however, in contrast thereto ice is precipitated. But this method has two substantial disadvantages.

The ice is mainly precipitated at the inlet side, which very quickly leads to the condensate cooler freezing up. Significant pressure losses occur very rapidly in the condensate cooler, which in turn lead to corresponding measurement errors. Furthermore, the ice customarily does not precipitate in the form of a massive smooth layer of ice, but in the form of hoarfrost, which has only slight sturdiness and mechanical stability. The ice needles being created in the course of this have a tendency to be carried along in the gas flow, which in turn leads to an erroneous representation of the humidity.

Regarding humidity representation methods by the 2-pressure/2-temperature systems, there are different variations, which substantially always aim toward a simplification of the basic principle. For example, the two temperatures $t_1$ and $t_2$ can be identical, and a purely 2-pressure system is obtained, wherein the relative humidity is only adjusted by the pressure. If, however, both pressures $p_1$ and $p_2$ are selected to be identical, a 2-temperature system results for the representation of the relative humidity. In the case of a dewpoint representation, such a system then is also called a 1-pressure generator, in which the dewpoint representation takes place only by the condenser temperature.

The systems can operate with a continuous gas flow, as described above. However, there are also systems (2-temperature generators, or 1-pressure generators), which are operated with a circulating gas flow.

Independently of the respective embodiment, all variations are however based on the same basic principle. With all systems, the construction of the condensate cooler or condenser between the saturation device and the consumer has a central importance. Although systems exist for all dewpoint ranges, which operate with great accuracy, completely different systems are customarily required for different dewpoint ranges which, moreover, can have substantial disadvantages in their operation (pressure loss, short service life, limitations at high temperatures).

Several known embodiments of the condensate cooler now exist.

Plate condensers or fin-type condensers are known, wherein the gas flow is conducted up and down in a meander shape in a plate condenser, in fact vertically. In this connection reference is made for example to the publication by A. Scholz "A Standard Calibrator for Air Hygrometers", OIML Bulletin No. 97, December 1984, pp. 18 to 27. In such condensate coolers, excess water is precipitated at the bottom of the condenser and must be removed relatively often, since too high a water level leads directly to pressure losses and therefore to measurement errors.

Condensate coolers in the form of helical tube coolers are furthermore known. Here, the gas flow is conducted in a helical tube through cooling medium, wherein the excess water is precipitated at the tube walls and flows into a water precipitator. This also must be periodically emptied.

Normally, these condenser structures can only be used for an actual condensate operation, they are only useful in a limited way for a humidity representation over ice and for a limited time, since the ice is precipitated immediately at the input side and plugs up the condenser.

OBJECT AND SUMMARY OF THE INVENTION

It is therefore an object of the present invention to disclose a device for creating reference humidity with a suitable condensate cooler, which is equally well suited for humidity representation methods with the use of ice and water in particular.

This object is attained by a device for creating a reference humidity that includes a saturation chamber and a condensate cooler in fluid communication with the saturation chamber and arranged downstream of the saturation chamber, wherein the condensate cooler is a fin-type condenser whose arrangement is such that substantially horizontal gas flow through the condensation cooler results. A measuring chamber connected with the condensate cooler, in which a desired reference humidity is definitely set by varying pressures and/or temperatures.

In accordance with the present invention, at least one condensate cooler is employed in a device for creating reference humidity, which is embodied as a fin-type condenser and whose arrangement has been selected to be such that an essentially horizontal gas flow through it is assured. The above mentioned problems regarding the liquid being precipitated at the fins can be avoided here.

In an advantageous embodiment, the condensate cooler of the device in accordance with the present invention includes two partial condensate coolers connected in series, which are similarly designed and each of which assures an essentially horizontal gas flow. In this case both partial condensate coolers are advantageously arranged on top of each other. Preferably a pre-condenser is arranged upstream of the first partial condensate cooler at the input and is for example designed as a downward leading helical tube.

Furthermore, in the present invention is advantageous if a vertical connecting line is arranged between the two partial condensate coolers, which has a defined condensate overflow in the upper partial condensate cooler. In this way it is possible to assure that a defined condensate level always remains in the upper partial condensate cooler.

The fins, or the condenser block are advantageously made of a special steel or other inert material. This block is sealed at the bottom by a flange, so that the sealing joint is always covered by the condensate.

Based on the embodiment in accordance with the present invention of the device for creating reference humidity, it is now possible to provide dewpoint temperatures in the range between −60° C. and 90° C. by means of a system. In this case the lower limit is determined only by the achievable condenser temperature $t_1$, and furthermore by the validity range of the reference functions. The upper limit results on the one hand from the atmospheric pressure, as well as from the maximum cooling output of the condenser, and again from the validity range of the reference functions in accordance with the Sonntag, Hardy and Greenspan references mentioned previously.

Further advantages, as well as details of the present invention ensue from the following description of an exemplary embodiment, making reference to the attached drawings.

DETAILED DESCRIPTION OF THE PREFERRED EMBODIMENTS

Figure 1:
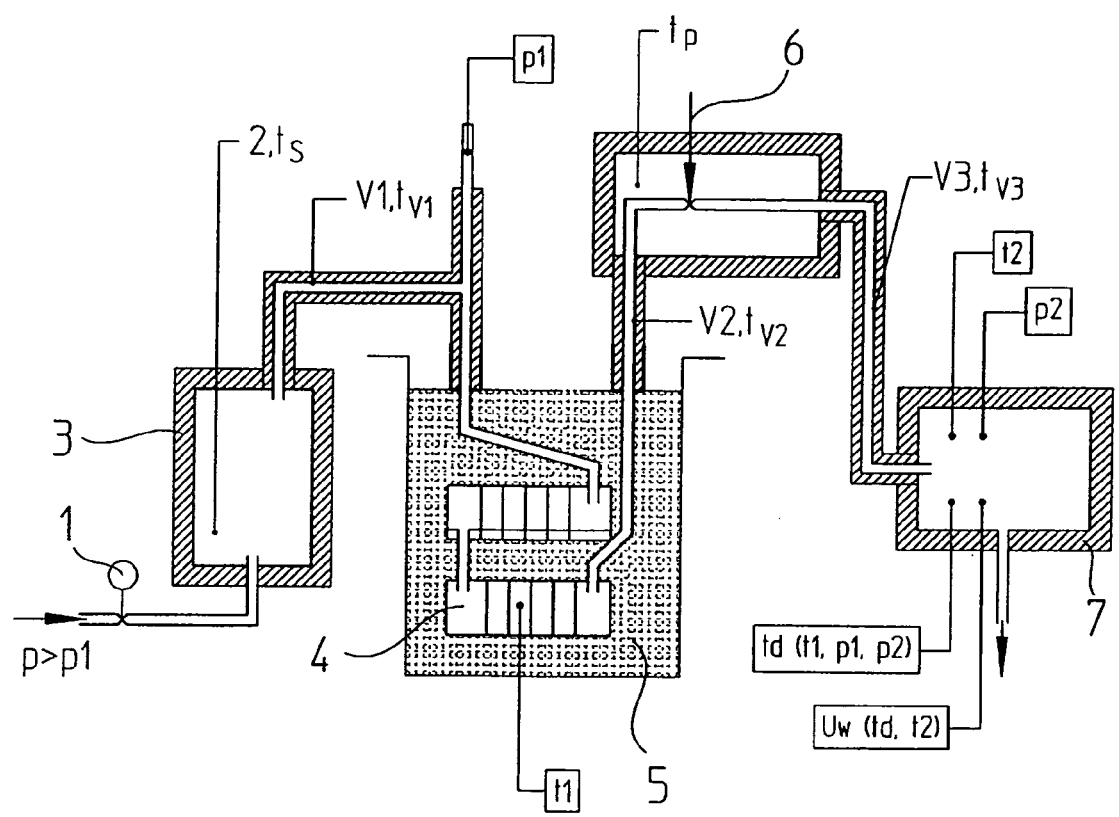
FIG. 1 is a schematic representation of an exemplary embodiment of a device in accordance with the present invention.

A possible structure of the device in accordance with the present invention for creating reference humidity, which substantially corresponds to the 2-pressure/2-temperature humidity generator already explained above, will first be explained by FIG. 1.

Dry air or nitrogen at a pressure $p_1$ is conducted here via a pressure regulator 1 through a water bath 2 in a saturating device or a saturation chamber 3 (pre-saturating device) with the temperature $t_s$. As a result, practically water vapor-saturated air at an approximate dewpoint temperature $\_t_s$ at a pressure $p_1$ is obtained. Subsequently, the saturated air is conducted through a heated connecting line V1 at a temperature $t_{v1} > t_s$ into a multi-stage condensate cooler 4. The temperature-stabilized condensate cooler 4 is arranged in a highly stable liquid bath 5, and cools the inflowing air to the condenser temperature $t_1$, wherein simultaneously the entire amount of excess water appears as the condensate. As a result, air at a pressure $p_1$ and a temperature $t_1$ is obtained, which is completely saturated with water vapor. The pressure $p_1$ and temperature $t_1$ are measured directly in the condensate cooler 4. In many cases the condensate cooler or condenser is therefore also called a "saturating device", since its main function is the generation of air saturated with water vapor. In this case the saturating device in the form of the saturation chamber 3 is also called a "pre-saturating device". Regarding the steps on the part of the condensate cooler 4 used, reference is made to FIGS. 2, 3 and 4a, 4b which follow.

The saturated air is removed from the condensate cooler 4 through a heated connecting line V2 at a temperature $t_{v2} > t_1$, and is relaxed to the pressure $p_2$ via a heated needle valve 6 with the temperature $t_p > t_{v2}$ and is conducted through a heated connecting line V3 with the temperature $t_{v3} > t_{v2}$ to a measuring chamber, wherein the gas pressure $p_2$ is measured at the location of the measuring chamber 7.

Figure 2:
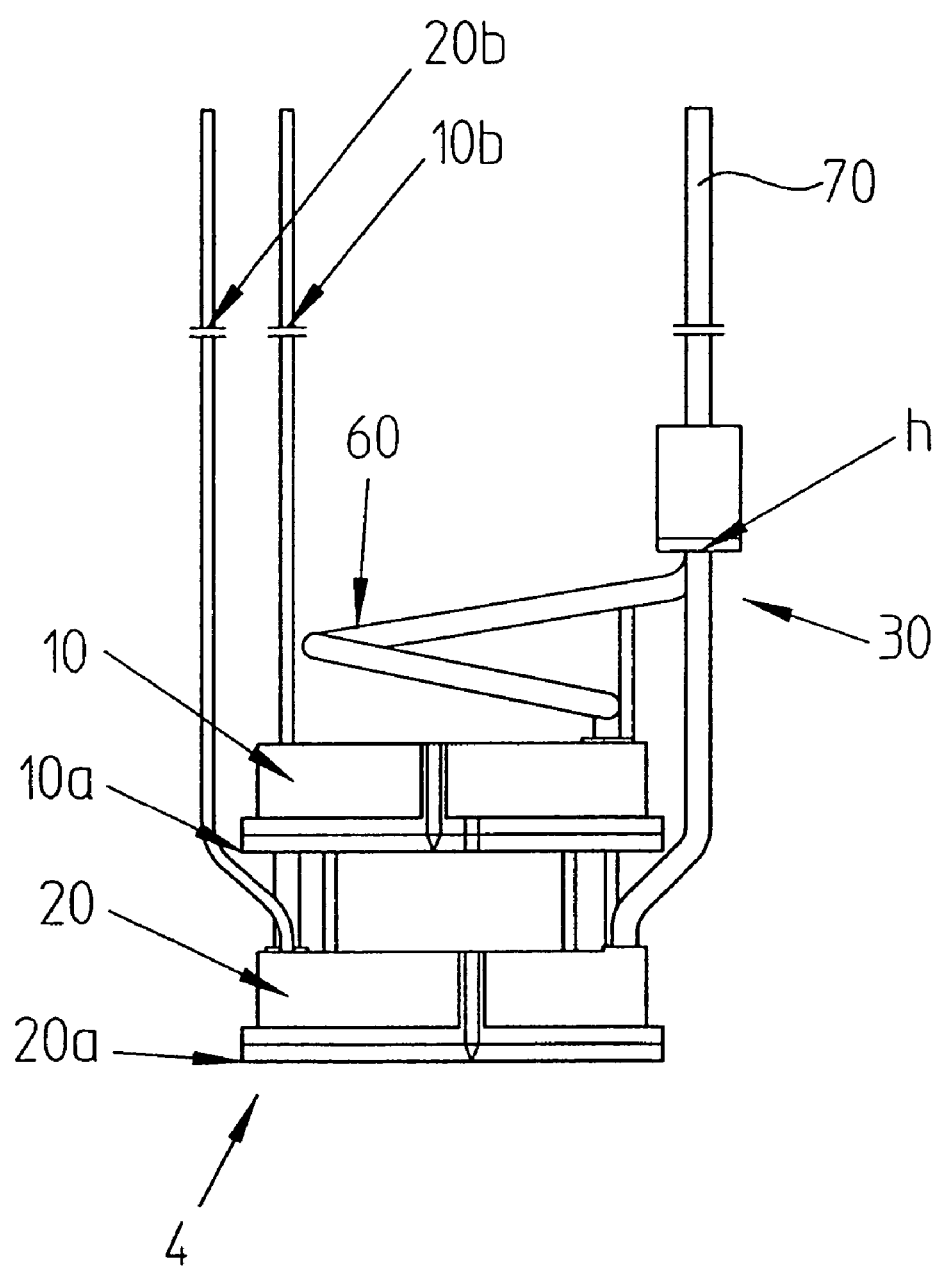
FIG. 2 is a plan view of an embodiment of a condensate cooler to be used with the device of FIG. 1 in accordance with the present invention.
Figure 3:
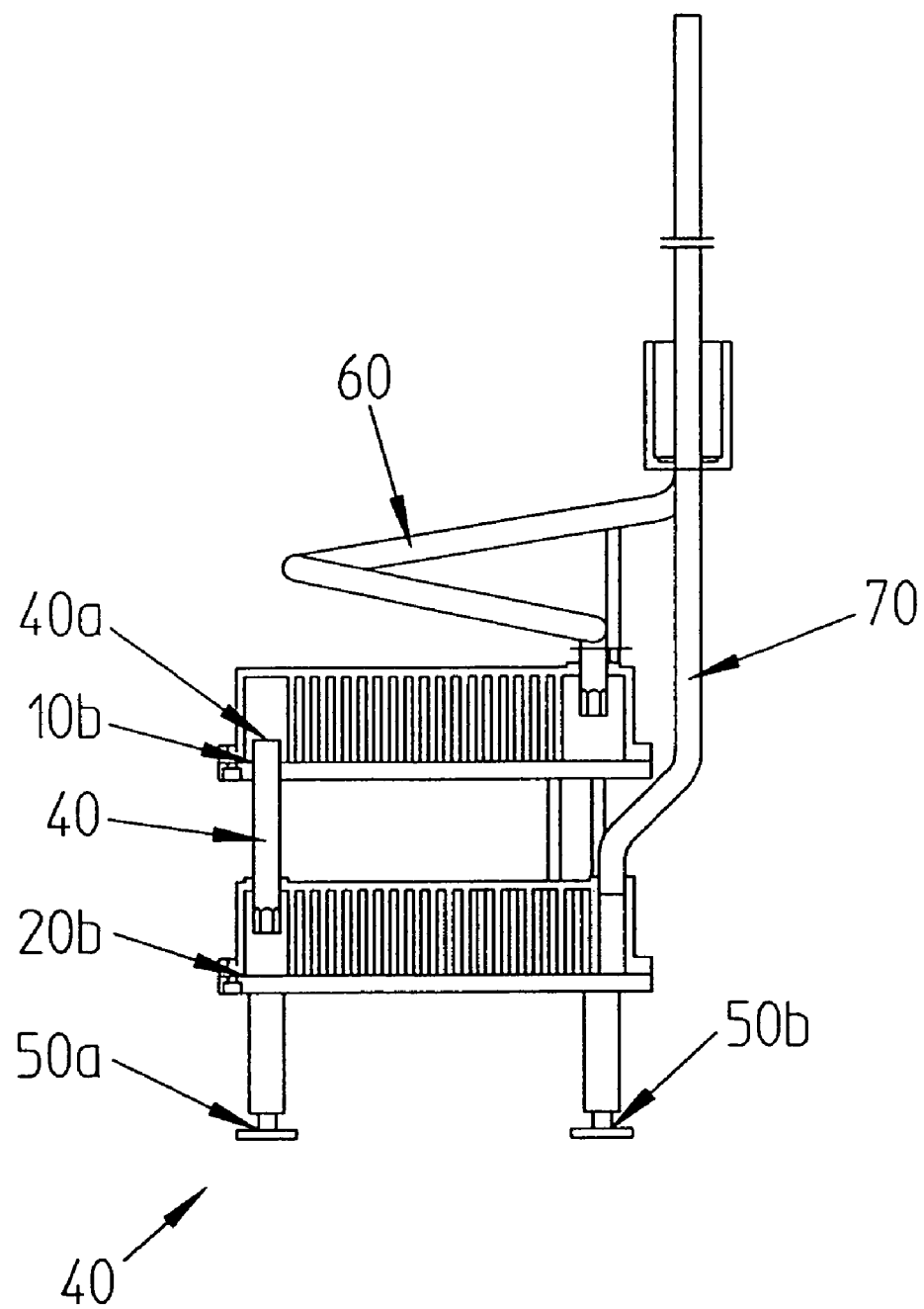
FIG. 3 is a sectional view of the condensate cooler of FIG. 2.

The basic structure of the condensate cooler 4 of the device in accordance with the present invention will now be explained by FIGS. 2, 3, as well as 4a, 4b.

The condensate cooler 4 used in this exemplary embodiment here includes two partial condensate coolers 10, 20, arranged on top of each other and connected in series, which are immersed in the liquid bath to a depth h and are temperature-stabilized to the temperature $t_1$. The partial condensate coolers 10, 20 are designed as plate or fin-type condensers and are arranged in such a way the gas guidance through each of the partial condensate coolers 10, 20 takes place in a horizontal meander fashion. The condensation water or condensate is precipitated at the fins of the partial condensate coolers 10, 20 and collects under the influence of gravity at the bottom of the respective partial condensate cooler 10, 20. Because of the horizontal flow of the gas, the cross section of the gas flow remains unaffected to a large extent by the level of the condensate, which results in a very low loss of flow (pressure loss), which is independent to a large extent of the condensate level. Measurements show that even when only half filling the partial condensate coolers 10, 20 results, no measurable change in the pressure loss occurs.

Figure 4A:
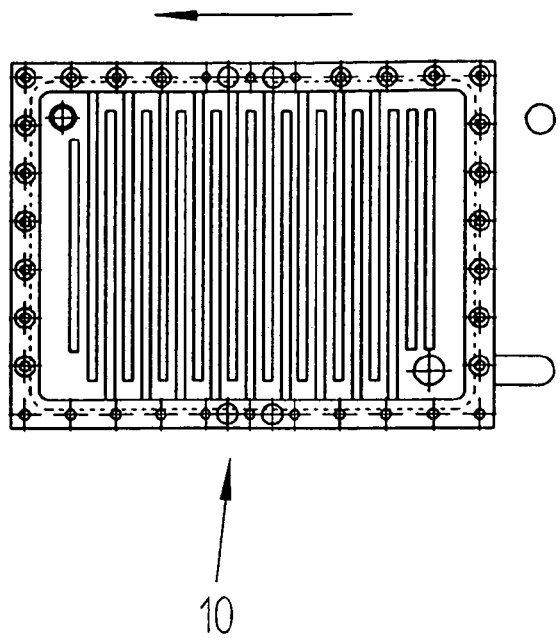
FIGS. 4a, 4b each represent a sectional view of the condensate cooler of FIG. 2.
Figure 4B:
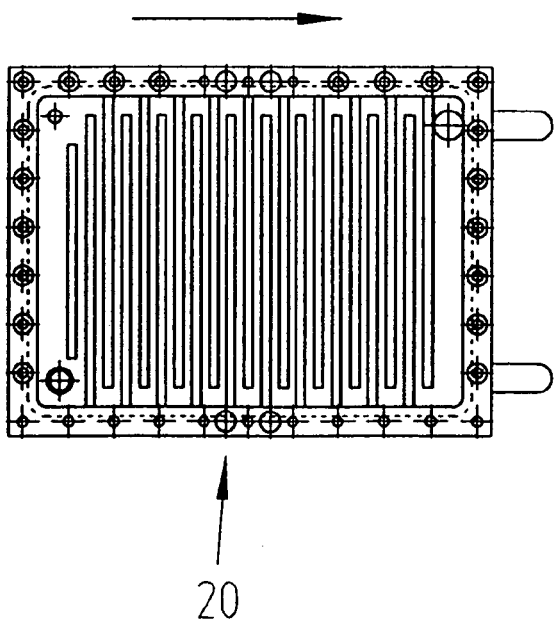

A plan view of the two partial condensate coolers 10, 20 from below is represented in the two FIGS. 4a, 4b. Here, for one, the fins are clearly discernible, which result in a meander-like gas guidance in the interior of the two partial condensate coolers 10, 20. It can furthermore be seen that the flat fins are each oriented vertically with respect to the direction of the gas flow, which is intended to be indicated by the two arrows in the drawings figures.

In contrast thereto, with a vertical guidance of the gas, such as is customary in the prior art, even a low condensate level leads to a part of the fins being completely immersed in the condensate. This results in a significant increase of the pressure losses and to corresponding errors.

Moreover, the horizontal guidance of the gas in accordance with the present invention offers still another advantage. It is possible to produce the fins of the partial condensate coolers 10, 20 from a single block of stainless steel or a similar inert material, wherein sealing of the partial condensate coolers 10, 20 takes place via a cover 10a, 20a at the bottom of the respective partial condensate cooler 10, 20. Because of the condensate level, the respective sealing joint 10b, 20b is always covered with water, which has the substantial advantage that in the course of the gas guidance the air saturated with water vapor is in fact only in contact with water (condensate) and the inert material of the condenser block, and not with sealing materials.

In an alternative embodiment, the gas guidance in the partial condensate coolers 10, 20 could also be provided in a helical manner alternatively to the meander-like gas guidance, but always horizontally.

Alternatively to the use of special steel, the employment of nickel-coated brass for the partial condensate coolers 10, 20 would furthermore also be possible.

Moreover, it should be noted here that the two-stage construction of the condensate cooler is basically not required. Thus, an embodiment of the device of the present invention would also be possible which would include only a single fin-type condenser with horizontal gas guidance.

In the exemplary embodiment represented, the two partial condensate coolers 10, 20 are connected with each other by a vertically arranged connecting line 40. In the upper partial condensate cooler 10, the latter is simultaneously designed as a condensate overflow 40a from the partial condensate cooler 10 to the partial condensate cooler 20 in such a way that a water level of approximately 10 mm is always maintained in the upper partial condensate cooler 10.

The two partial condensate coolers 10, 20 have been placed on thermally insulated bases 50a, 50b in the temperature-stabilized bath. In an alternate embodiment, the two partial condensate coolers 10, 20 could also suspended from above in the temperature-stabilized bath.

Moreover, a pre-condenser 60 in the shape of a helical tube is connected upstream of the two partial condensate coolers 10, 20, which is also arranged in the temperature-stabilized liquid bath. It is possible to show that the substantial energy removal in the gas flow already takes place in the pre-condenser, or in the helical tube, and the two partial condensate coolers 10, 20 are merely used for precise temperature matching and complete saturation of the air.

Because of the multi-stage construction of the present exemplary embodiment, a very good matching of the temperature of the gas flowing through to the temperature of the bath is achieved in spite of the actually poor heat conductivity of the special steel material used for the partial condensate coolers 10, 20, wherein practically no pressure loss takes place. It is simultaneously possible to achieve a very high cooling output, which even makes possible a dewpoint representation up to 90° C.

It is possible to show by measurements that with the construction of a condensate cooler 4 represented in FIGS. 2, 3, 4a, 4b, no measurable change of the dewpoint temperature shown occurs in a gas flow of 5 l/min up to a cooling output of 250 W. This is sufficient for a dewpoint representation up to 90° C. with the following parameters:

$t_s$=106° C. (saturating or pre-saturating temperature)
$t_1$=100° C.
$p_1$=1432 hPa
$p_2$=990 hPa
$t_{v1}$=111° C.
P=173 W The two partial condensate coolers 10, 20 offer the opportunity of removing the condensate through the evacuation lines 10b, 20b. In this case the evacuation lines 10b, 20b are laid out in such a way that a minimum level of condensate always remains, and the respective partial condensate cooler 10, 20 never becomes completely dry. In consideration of the gas flow, the evacuation lines 10b, 20b have been placed between the two partial condensate coolers 10, 20, so that an effect of returning water on the represented dewpoint in the evacuation lines 10b, 20b is prevented.

It is additionally possible in connection with alternative embodiments for still further evacuation lines to be arranged in adjoining positions, which are structurally laid out in such a way that the complete emptying of the partial condensate coolers becomes possible.

Moreover, in further embodiments it would be possible to use nickel-coated brass in place of special steel as the material for the partial condensate coolers 10, 20. The possible cooling output could be substantially increased because of the even better heat conductivity of this material.

The guidance of the gas in the condensate cooler 4 of the exemplary embodiment represented will be explained in detail by FIGS. 1, 2, 3, 4a, 4b.

A gas flow, which is saturated with water vapor to a large degree, comes from the saturating device 3 with the temperature $t_s$ through the connecting line V1 with the temperature $t_{v1}$. The gas flow enters the pre-condenser 60 at the point 30 and is already cooled to a large extent to the bath temperature $t_1$. In the process, excess water is condensed out of the gas flow and runs, together with the gas flow, in the helical tube of the pre-condenser 60 into the first partial condensate cooler 10. The condensed water from the helical tube is collected in the partial condensate cooler 10 and is evenly distributed over the floor of the partial condensate cooler 10 up to a maximum filling level, which is defined by the condensate overflow 40a.

The gas flow passes in a meander-shape horizontally through the partial condensate cooler 10 and its temperature is matched for all practical purposes to the bath temperature. The remaining excess water also collects at the floor of the partial condensate cooler 10. After passing through the partial condensate cooler 10, the gas flows through the connecting line 40 into the partial condensate cooler 20. Moreover, starting at a defined condensate level in the first partial condensate cooler 10, the condensate flows through the same connecting line 40 into the second partial condensate cooler 20 and also covers the floor there.

The gas flow passes through the second partial condensate cooler 20 in the same way as through the partial condensate cooler 10 and leaves the condensate cooler 4 through the outlet line 70. At this point, the gas has a dewpoint temperature corresponding to $t_1$ at a gas pressure of $p_1$.

Under normal conditions, only the partial condensate cooler 20 will be emptied. The water level in the first partial condensate cooler 10 will then always correspond to the maximum water level defined by the overflow 40a. The minimum condensate level, which is defined by the position of the evacuation line 20b, exists in the second partial condensate cooler 20. During operation it is permissible to have a condensate level up to approximately half the height of the partial condensate cooler without negatively affecting the dewpoint representation which, in the construction shown in the drawing figures, corresponds approximately to an amount of 200 ml of condensate.

Under these conditions it is possible to continuously operate the device in accordance with the invention for creating reference humidity in the middle dewpoint range ($t_d$<70° C.) with a gas flow of 5 l/min between a few hours up to a week. In the extreme case the length of operation at a gas flow of 5 l/min and a dewpoint of 90° C. is approximately one hour, which is sufficient for taking a measurement. In this case it is possible to increase the service life by the timely emptying of the partial condensate cooler 10.

By the same condensate cooler 4 it is moreover possible to also provide a humidity representation over ice. In this case a condensate level in the first partial condensate cooler 10 is provided which corresponds to the overflow 40a. A comparative condensate level is provided in the second partial condensate cooler 20 either by a corresponding operation or by directly filling the second partial condensate cooler 20 with extremely clean water through the evacuation line 20b.

Subsequently the condensate cooler 4 is only operated with dry air or $N_2$, and the bath temperature is simultaneously lowered below 0° C., ideally to at least −15° C. The water in the partial condensate coolers 10, 20 freezes and forms a solid ice layer. The dry air (dewpoint temperature<<bath temperature $t_1$) is moistened above the ice layer by sublimation in accordance with the saturation vapor pressure over ice (the Sonntag reference).

The ice in the two partial condensate coolers 10, 20 is used up for moistening. With a consumption of ice of ˜100 g (filling the condensers in the above example amounts to approximately 300 g), the operating time of the system is more than 300 hours at a gas flow of 5 l/min and a dewpoint of −20° C.

This type of operation is reasonable only for dewpoint temperatures $t_d$<−20° C., for higher temperatures is makes sense to perform the humidity representation over water. However, there is a range within which both methods can be performed, so that the functioning of the system can be checked in this way. In the course of appropriate tests regarding uncertainty in connection with the measurements in the dewpoint range between −10° C. and −25° C., no difference between the two modes of operation can be detected.

At a bath temperature of 40° C. and a pressure $p_1$=6715 hPa at an ambient pressure of 990 hPa it is possible in this way to achieve a dewpoint of −60° C.

The dewpoint can be further lowered by a bath temperature below −40° C. A dewpoint of −90° C. can be obtained with $t_1 = -70°$ C. and $p_1 = 12215$ hPa.

As already mentioned above, the embodiment of a condensate cooler 4 represented in FIGS. 2, 3, 4a and 4b in a form in accordance with the present invention only represents a possible variation. Depending on the demands made on the system (cooling output, range of employment, gas flow) it would be possible at any time to suitably match the measurements and materials to the requirements.

Further exemplary embodiments exist within the scope of the present invention besides the described examples.

I claim:

1. A device for creating a reference humidity, the device comprising:
    a saturation chamber;
    a condensate cooler in fluid communication with said saturation chamber and arranged downstream of said saturation chamber, wherein said condensate cooler is a fin-type condenser whose arrangement is such that substantially horizontal gas flow through said condensation cooler results; and
    a measuring chamber connected with said condensate cooler, in which a desired reference humidity is definitely set by varying pressures and/or temperatures.

2. The device in accordance with claim 1, wherein said fin-type condenser is designed so that a meander-shaped gas guidance of flowing gases therein results.

3. The device in accordance with claim 1, wherein said fin-type condenser is designed so that a helix-shaped gas guidance of flowing gases therein results.

4. The device in accordance with claim 1, wherein said condensate cooler comprises:
    a first partial condensate cooler; and
    a second partial condensate cooler that is connected in series with said first partial condensate cooler.

5. The device in accordance with claim 4, wherein said first and second partial condensate coolers are each embodied as a fin-type condenser.

6. The device in accordance with claim 4, wherein said first and second partial condensate coolers are arranged one above the other.

7. The device in accordance with claim 6, further comprising a pre-condenser arranged upstream of said first partial condensate cooler.

8. The device in accordance with claim 7, wherein said pre-condenser is a downward extending helical tube.

9. The device in accordance with claim 6, wherein said first and second partial condensate coolers are connected with each other by a connecting line arranged between them.

10. The device in accordance with claim 9, wherein said connecting line has a defined condensate overflow in said first partial condensate cooler which is arranged above said second partial condensate cooler.

11. The device in accordance with claim 6, wherein said first and second partial condensate coolers are connected with an evacuation line.

12. The device in accordance with claim 1, wherein said fin-type condenser is made from a block of inert material.

13. The device in accordance with claim 12, wherein said block is sealed at a bottom thereof by a flange.

14. The device in accordance with claim 1, wherein said fin-type condenser comprises flat fins arranged vertically in relation to gas flow within said fin-type condensate.

* * * * *